United States Patent
Yamamoto et al.

(10) Patent No.: US 10,363,948 B2
(45) Date of Patent: Jul. 30, 2019

(54) TRAIN CONTROL DEVICE, TRAIN CONTROL METHOD AND COMPUTER PROGRAM PRODUCT

(71) Applicant: Kabushiki Kaisha Toshiba, Minato-ku (JP)

(72) Inventors: Junko Yamamoto, Yokohama (JP); Satoshi Iba, Hachioji (JP); Yohei Hattori, Koto (JP); Yasuyuki Miyajima, Kunitachi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 84 days.

(21) Appl. No.: 15/543,390

(22) PCT Filed: Dec. 24, 2015

(86) PCT No.: PCT/JP2015/086080
§ 371 (c)(1),
(2) Date: Jul. 13, 2017

(87) PCT Pub. No.: WO2016/114088
PCT Pub. Date: Jul. 21, 2016

(65) Prior Publication Data
US 2018/0327005 A1    Nov. 15, 2018

(30) Foreign Application Priority Data
Jan. 13, 2015    (JP) .................................. 2015-004413

(51) Int. Cl.
*B61L 3/00*    (2006.01)
*B60L 15/20*    (2006.01)
(Continued)

(52) U.S. Cl.
CPC ............... *B61L 3/008* (2013.01); *B60L 15/20* (2013.01); *B61L 25/025* (2013.01); *B61L 25/04* (2013.01);
(Continued)

(58) Field of Classification Search
CPC .......... B61L 3/008; B61L 15/20; B61L 25/04; Y02T 10/7258
See application file for complete search history.

(56) References Cited

U.S. PATENT DOCUMENTS

| | | | | |
|---|---|---|---|---|
| 4,041,878 A | * | 8/1977 | Toran | B61F 5/24 105/164 |
| 5,775,230 A | * | 7/1998 | Joos | B61F 5/22 105/199.2 |
| 6,087,950 A | * | 7/2000 | Capan | B61L 1/14 310/318 |

FOREIGN PATENT DOCUMENTS

| | | |
|---|---|---|
| JP | 58-110368 A | 6/1983 |
| JP | 6-153327 A | 5/1994 |

(Continued)

OTHER PUBLICATIONS

International Search Report dated Mar. 29, 2016 in PCT/JP2015/086080.

*Primary Examiner* — Michael J Zanelli
(74) *Attorney, Agent, or Firm* — Oblon, McClelland, Maier & Neustadt, L.L.P.

(57) ABSTRACT

According to an embodiment, a train control device includes an acceleration detection unit and a train control unit. The acceleration detection unit detects acceleration of a train along a rotation radius direction, when the train is turning and passing a curved section of a rail line with a cant. The train control unit sets a passing speed of the train passing (Continued)

through the curved section so that a state of the train is placed in a balanced cant, based on a direction of the detected acceleration.

6 Claims, 5 Drawing Sheets

(51) Int. Cl.
  *B61L 25/02* (2006.01)
  *B61L 25/04* (2006.01)
  *B61L 27/00* (2006.01)
(52) U.S. Cl.
  CPC ....... *B61L 27/0038* (2013.01); *Y02T 10/7275* (2013.01)

(56) References Cited

FOREIGN PATENT DOCUMENTS

| | | |
|---|---|---|
| JP | 6-207830 A | 7/1994 |
| JP | 7-65038 A | 3/1995 |
| JP | 7-131907 A | 5/1995 |
| JP | 8-207764 A | 8/1996 |
| JP | 3620790 B2 | 2/2005 |
| JP | 2005-204462 A | 7/2005 |
| JP | 2005-343294 A | 12/2005 |
| WO | WO 2007/074980 A1 * | 7/2007 |

* cited by examiner

TRAIN CONTROL DEVICE, TRAIN CONTROL METHOD AND COMPUTER PROGRAM PRODUCT

CROSS-REFERENCE TO RELATED APPLICATIONS

This application is national stage application of International Application No. PCT/JP2015/086080, filed Dec. 24, 2015, which designates the United States, incorporated herein by reference, and which claims the benefit of priority from Japanese Patent Application No. 2015-004413, filed Jan. 13, 2015, the entire contents of which are incorporated herein by reference.

Embodiments described herein relate generally to a train control device, a train control method, and a computer program product.

BACKGROUND

In general, factors that affect the riding comfort of a railway vehicle include interior space of the vehicle, sitting comfort of a seat, crowdedness, and the like. In addition to the above, the factors that affect the riding comfort of a railway vehicle include acceleration applied to the passengers in the horizontal direction, the vertical direction, and the front-to-rear direction, due to the movement of the vehicle and impact on the vehicle.

More particularly, the riding comfort is greatly affected by the acceleration caused by curves, shapes of rails according to the gradient and the like, discontinuous rails when the train is passing through a branch section, and change in speed due to the acceleration or deceleration of the vehicle.

CITATION LIST

Patent Literature

SUMMARY OF THE INVENTION

Problem to be Solved by the Invention

For example, when a train is passing through a branch section (point section) where a turnout (point) is provided, the train runs on the rail that is not continuous at short intervals. Thus, vibration occurs in the vehicle, and the riding comfort may be deteriorated. At a location where the branch sections continue, the vibration occurs repeatedly. Hence, the riding comfort deteriorates even more. As a result, some drivers slow down the speed of a train when the train is passing through the branch section, to prevent deterioration in riding comfort.

Automatic train operation equipment (ATO device) is also capable of preventing deterioration in riding comfort, by lowering the speed of the train while the train is passing through the branch section. This is possible by setting an apparent speed limit at the branch section, or specifying the speed of the train when the train is passing through the branch section. However, when a train needs to run between stations at a running time shorter than usual, for example, when the departure of the train from a station is delayed, the running time of the train between the stations may not be reduced with the apparent speed limit being observed.

Moreover, when a train is passing through a curved section of the rail line, the speed at which the centrifugal force and a cant are balanced differs according to the type of vehicle and the vehicle occupancy. Thus, when the train runs at an imbalanced speed, the acceleration is applied to the passengers in the lateral direction, and the riding comfort may be deteriorated.

The embodiment has been made in view of the above, and an object of the embodiment is to provide a train control device, a train control method, and a computer program product that can reduce the deterioration in riding comfort.

DETAILED DESCRIPTION

According to an embodiment, a train control device comprises an acceleration detection unit and a train control unit. The acceleration detection unit detects acceleration of a train along a rotation radius direction, when the train is turning and passing a curved section of a rail line with a cant. The train control unit sets a passing speed of the train passing through the curved section so that a state of the train is placed in a balanced cant, based on a direction of the detected acceleration.

Next, a train control system including a train control device of an embodiment will be described in detail with reference to the accompanying drawings.

Figure 1:
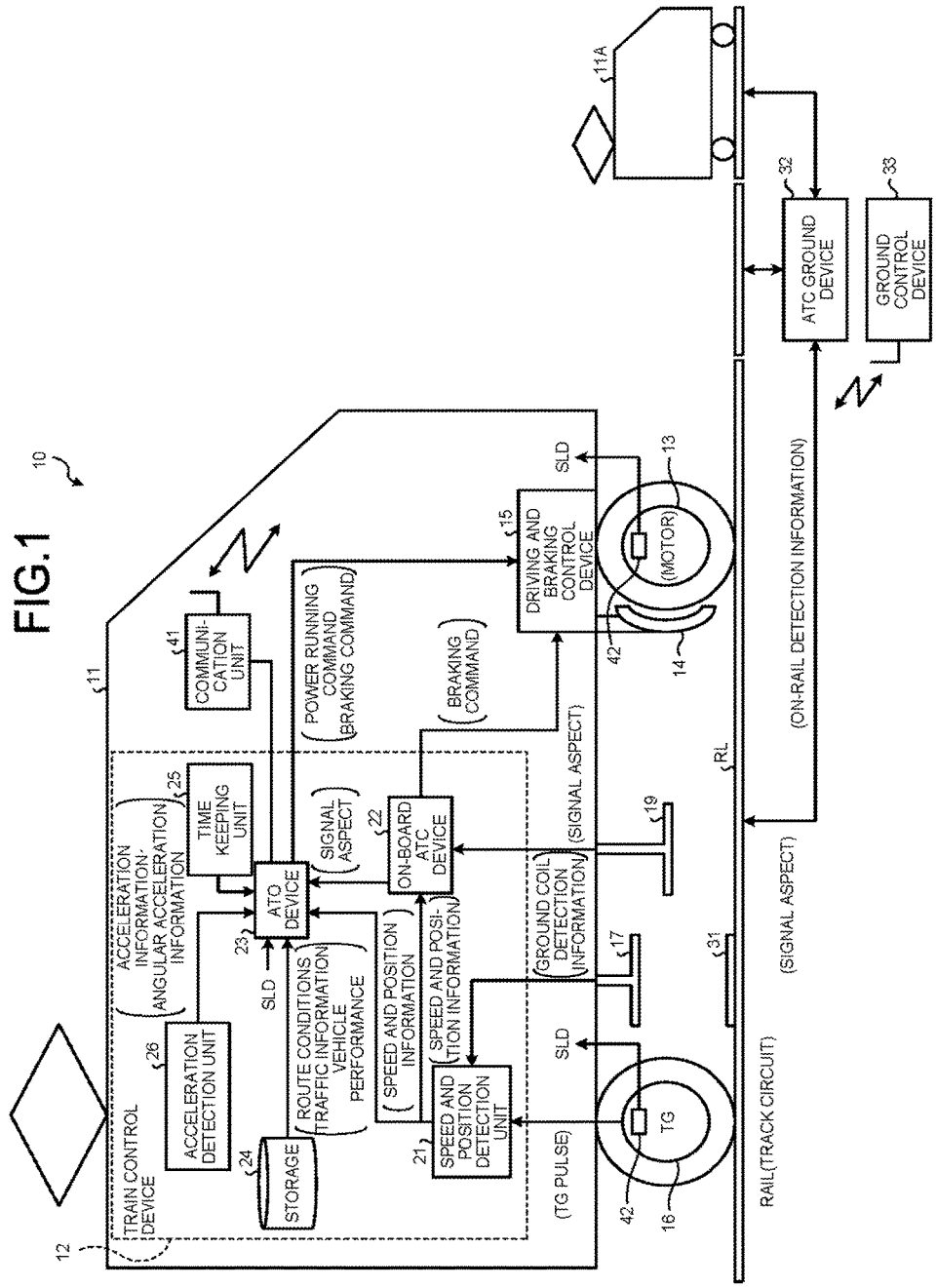
FIG. 1 is a block diagram of a schematic configuration of a train control system of an embodiment according to the embodiment.

FIG. 1 is a block diagram of a schematic configuration of a train control system of an embodiment.

A train 11 that constitutes a train control system 10 includes a train control device 12 that controls the train 11, a driving and braking control device 15 that controls a motor 13, a braking device 14, and the like on the basis of a power running command, a braking command, and the like from the train control device 12. The train 11 also includes a tachometer generator 16 and a pickup coil 17 that outputs ground coil detection information.

Moreover, the train 11 includes a power receiver 19 that receives an automatic train control (ATC) signal via a rail RL that constitutes a track circuit, a communication unit 41 that performs wireless communication with a ground control device 33, and a load compensation detecting sensor 42 that detects load compensation of a vehicle constituting the train 11 and that outputs a load compensation detection signal SLD.

The vehicle runs on the rail while the motor and the braking device that are controlled by the driving and braking control device drive and brake the wheels.

In the above configuration, the train control device 12 includes a speed and position detection unit 21 that detects the speed and running position of the train 11, an on-board ATC device 22 that automatically controls the speed of the train 11, and an automatic train operation (ATO) device 23 that automatically operates the train 11. The train control device 12 also includes a storage 24 that stores therein route conditions, traffic conditions, vehicle performance, and the like; a time keeping unit 25 that keeps time and outputs time keeping information; and an acceleration detection unit 26 that detects acceleration and angular acceleration of the train 11, and that outputs acceleration information and angular acceleration information.

More specifically, the speed and position detection unit 21 detects the speed and position of the train on the basis of a TG pulse that is output from the TG 16 as well as the ground coil detection information that is received from a ground coil 31 via the pickup coil 17. The speed and position detection unit 21 then outputs the speed and position of the train to the on-board ATC device 22 and the ATO device 23 as speed and position information.

Moreover, the on-board ATC device 22 obtains distance between the train 11 and a preceding train 11A on the basis of the speed and position information that is received from the speed and position detection unit 21, and the ATC signal transmitted from an ATC ground device 32 that is received via the rail RL and the power receiver 19. To limit the running speed of the train, the on-board ATC device 22 compares the speed limit based on the ATC signal with the speed of the train 11 corresponding to the speed and position information that is output from the speed and position detection unit 21. When the speed of the train 11 exceeds the speed limit, the on-board ATC device 22 outputs a braking command to the driving and braking control device. In this example, the ATC ground device 32 detects the presence of a train on the rail tracks in closed sections via the rail RL forming the track circuit, determines an ATC signal (signal aspect) in the closed sections depending on the state of the train on the rail tracks, and transmits the ATC signal to the on-board ATC device 22 via the rail RL.

The ATO device 23 outputs the power running and braking commands to the driving and braking control device 15 to make the train 11 run to the next station. The ATO device 23 calculates a running plan so that the train 11 arrives at a certain position in the next station at a certain time. The running plan is calculated on the basis of the speed and position information that is output from the speed and position detection unit 21 as well as route information, traffic information and vehicle information that are read out from the storage 24. The running plan is also calculated on the basis of the ATC signal (signal aspect) received by the on-board ATC device 22, and the time keeping information (current time) received from the time keeping unit 25. The ATO device 23 then outputs the power running and braking commands on the basis of the running plan.

Moreover, the ATO device 23 detects the turning direction of the train 11 at each branching position, by integrating the angular acceleration in the yaw direction that is input from the acceleration detection unit 26. The ATO device 23 then determines which track the train 11 has entered on the basis of the turning direction and the number of turns. When the train 11 has entered the track other than the reference track corresponding to the running plan determined in advance, the ATO device 23 corrects the position information on the basis of a difference between the running distances to the stop target positions.

Furthermore, when the acceleration of the vehicle in the vertical direction or the horizontal direction that is input from the acceleration detection unit 26 is equal to or more than a certain value (when the vehicle is vibrated at an amplitude of equal to or more than a certain value), the ATO device 23 associates the acceleration direction, the amplitude, the turning direction of the train, the passing speed, the position where the vibration has occurred, and the date and time of occurrence with one another, as vibration detection information. The ATO device 23 then stores the associated pieces of information as a set up to a certain number (for example, the latest 100 sets).

When the number of times vibration detection information is stored (the number of times the vibration is detected) within a certain period as well as within certain distance range becomes equal to or more than a certain value, the ATO device 23 determines the speed of the train running on the running position so as to be lower than the stored passing speed, within a range so that a certain allowable running time can be observed between the stations including the running position. The ATO device 23 then associates the determined speed with the running position, the turning direction of the train, and information on the date and time, as running adjustment information. The ATO device 23 then stores the associated pieces of information as a set.

Moreover, the ATO device 23 sets the speed of the train passing a curved section to be lower than the passing speed, when the acceleration of the train in the horizontal direction is positive relative to the outside of the curved line (direction opposite from the rotation center), on the basis of the acceleration in the horizontal direction that is input from the acceleration detection unit 26 while the train is running the curved section of the rail line RL as well as the load compensation information.

Similarly, the ATO device 23 sets the speed of the train passing the curved section to be higher than the passing speed, when the acceleration in the horizontal direction is positive relative to the inside of the curved line (rotation center direction), on the basis of the acceleration in the horizontal direction that is input from the acceleration detection unit 26 while the train is running the curved section of the rail line RL as well as the load compensation information.

The ATO device 23 then associates the running position (=corresponds to the position of the curved section), the load compensation information, the speed (speed when the train passes the curved section), and information on the applied date and time with one another, as the running adjustment information. The ATO device 23 then stores the associated pieces of information as a set.

The storage 24 stores therein the stop target position at each station, gradients and curves (curvature radiuses) of the route, speed limit information of each closed section and the length of the closed section (distance of the closed section), and linear information, as the route information. The linear information includes an order of the closed sections; correspondence between each track at each station and a branching position, the turning direction at the branching position, and the closed section; and a difference between the running distance to the stop position of each track and the running distance to the stop position of a reference track. Moreover, the storage 24 stores therein the stations to stop for each driving type, and scheduled departure time as well as scheduled arrival time at each station, as the traffic information. Furthermore, the storage 24 stores therein the length of the train in which the storage 24 is installed as well as acceleration and deceleration characteristics corresponding to the power running and braking commands, as the vehicle information.

The time keeping unit 25 functions as a real time clock (RTC), and keeps the current time. The current time kept by the time keeping unit 25 is supplied to the ATO device 23. It is to be noted that the time keeping unit 25 synchronizes the current time kept by the time keeping unit 25 on the train 11 with the current time kept by the time keeping unit 25 on the train 11A. The synchronization is performed using a method of synchronizing the current time with global positioning system (GPS) time that is included in a GPS signal transmitted from a GPS satellite, a method of synchronizing the current time by communicating with a traffic control center, which is not illustrated, via a communication device, which is not illustrated, while the train is stopping at a station, or the like.

For example, the acceleration detection unit 26 is disposed on the center of the ceiling on both lead vehicles of a train set, and detects the acceleration and the angular acceleration of the train along six axes (front-to-rear axis, horizontal axis, vertical axis, yaw axis, pitch axis, and roll axis). In the following description, it is assumed that the acceleration detection unit 26 is fixed to all the vehicles in a set of the train 11.

Next, an operation of the train control system 10 of the embodiment will be described.

The ATO device 23 calculates a running plan (fastest running plan) with which the train 11 arrives at the next station earliest within a range not exceeding the speed limit. The ATO device 23 calculates the running plan on the basis of the speed and position of the train 11 corresponding to the speed and position information that is input from the speed and position detection unit 21 when the train 11 has departed a station; the route information, the traffic information, as well as the vehicle information to the next station that are read out from the storage 24; and the ATC signal (signal aspect) received by the on-board ATC device 22. The ATO device 23 then replaces constant-speed running or power running in a section of the calculated running plan to coasting, and calculates the running plan so that the train travels the next station with energy consumption as low as possible, and stops at a certain position in the next station at a certain time.

The ATO device 22 then outputs a power running command and a braking command to the driving and braking control device 15 on the basis of the running plan, while the train 11 is running. In this case, the ATO device 23 may also calculate the power running command and the braking command so that the speed of the train 11 will follow the run curve of the running plan. Moreover, the ATO device 23 may output the power running command and the braking command at the timing specified in advance in the running plan. Furthermore, the ATO device 23 may calculate the power running command and the braking command corresponding to the running mode (power running, constant speed, coasting, or deceleration) in the running plan.

In the event the train 11 has departed a station before or after the scheduled departure time, or when a deviation from the run curve exceeds a certain threshold while the train 11 is running, or if the running speed of the train 11 corresponding to the ATC signal that is received by the on-board ATC device 22 via the power receiver 19 exceeds the speed limit information read cut from the storage 24, the ATO device 23 recalculates the running plan with the current location, the current speed, and the current time as a starting point. The ATO device 23 calculates the power running command and the braking command on the basis of the latest running plan.

1. Train Running Control when Running Route Has Curve with Cant

Train running control when the running route has a curve with a cant will now be described.

Figure 2:
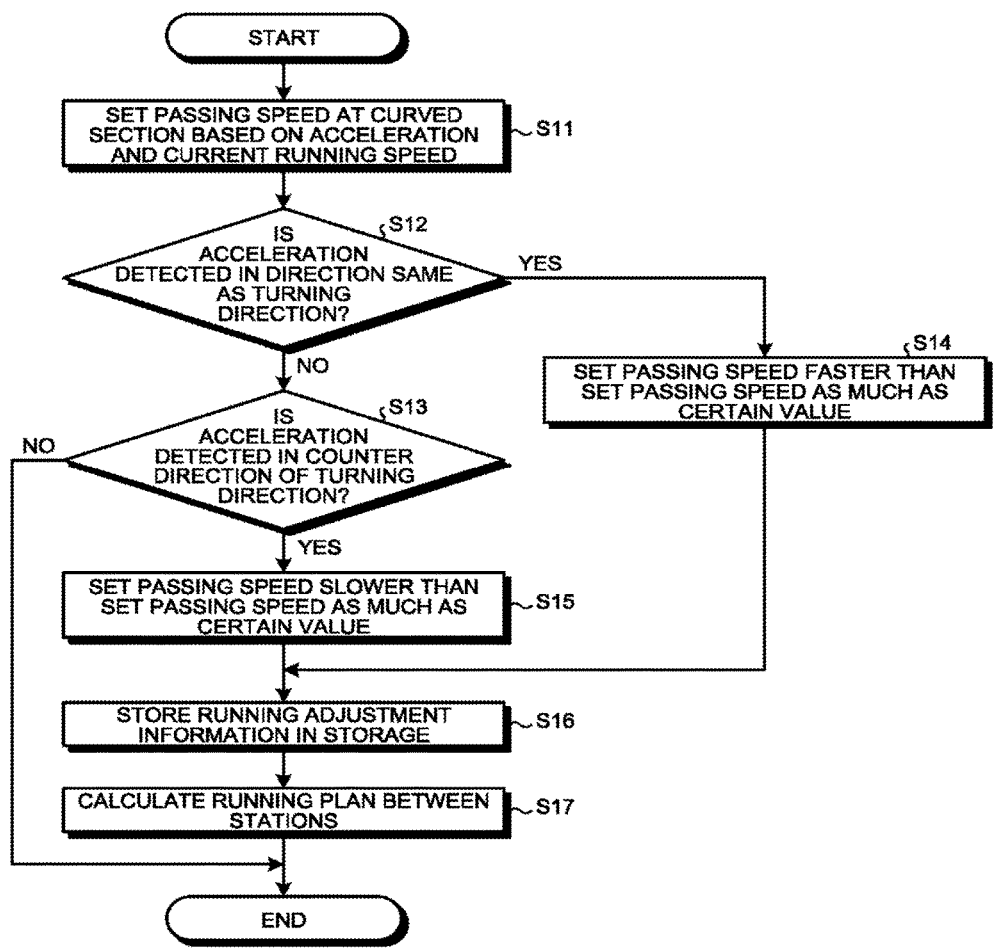
FIG. 2 is a processing flow chart of train running control when a running route has a curve with a cant according to the embodiment.

FIG. 2 is a processing flow chart of train running control when a running route has a curve with a cant.

While the train is running, when the running route corresponding to the installation position of the acceleration detection unit 26 that is on each of the vehicles has a curve with a cant, the ATO device 23 sets the speed of the train traveling the curved section, on the basis of the acceleration of the vehicle in the horizontal direction that can be obtained from the corresponding acceleration detection unit 26, and the running speed that can be obtained from the speed and position detection unit (step S11).

Figure 3:
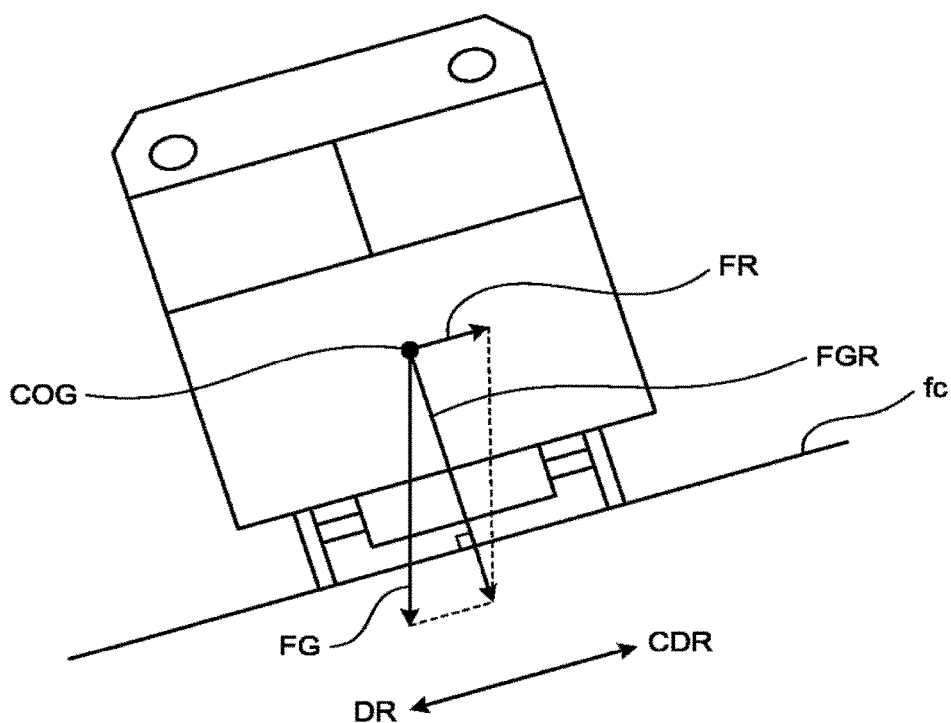
FIG. 3 is an explanatory diagram of a balanced cant according to the embodiment.

FIG. 3 is an explanatory diagram of a balanced cant.

In other words, the ATO device 23 sets the speed of the train while the train is running the curved section so that a state of the train is placed in a balanced cant.

In this example, as illustrated in FIG. 3, the balanced cant is an amount of cant AC with which resultant force FGR of gravity force FG acting on the center of gravity COG of a vehicle X and the centrifugal force FR becomes perpendicular to a cant surface fc.

More specifically, if the state of the train is placed in a balanced cant, in other words, if the resultant force FOR is perpendicular to the cant surface fc, as illustrated in FIG. 3, acceleration should not be detected both in a direction DR that is the same as the turning direction of the vehicle X and in a counter direction CDR.

Consequently, the ATO device 23 determines whether the acceleration detection unit 26 has detected acceleration in the direction DR (rotation center direction) that is the same as the turning direction (step S12).

In the determination at step S12, when the acceleration in the direction DR (rotation center direction) that is the same as the turning direction is detected (Yes at step S12), in other words, when the acceleration of the vehicle in the horizontal direction is positive relative to the inside of the curved line (rotation center direction), it means that the centrifugal force FR is not sufficient. Thus, the ATO device 23 sets the passing speed of the train faster than the passing speed that is obtained based on the running speed from the speed and position detection unit 21 as much as a certain value (for example, 2 km/h) so that the state of the train is placed in the balanced cant (step S14). The ATO device 23 then moves the process to step S16.

In the determination at step S12, when the acceleration in the direction DR (rotation center direction) that is the same as the turning direction is not detected (No at step S12), the ATO device 23 determines whether the acceleration detection unit 26 has detected the acceleration in the counter direction (rotation center direction) of the turning direction (step S13).

In the determination at step S13, when the acceleration detection unit 26 detects the acceleration in the counter direction CDR (rotation radius direction) of the turning direction (Yes at step S13), in other words, when the acceleration of the vehicle in the horizontal direction is positive relative to the outside of the curved line (direction opposite from the rotation center), it means that the centrifugal force FR is excessively strong. Thus, the ATO device 23 determines the passing speed of the train slower than the passing speed that is obtained based on the running speed from the speed and position detection unit 21 as much as a certain value (step S15).

The ATO device 23 then stores the running position (or position around the center of the curved section), the turning direction of the train 11, the load compensation information corresponding to the vehicle occupancy, the determined passing speed, and information on the applied date and time, as the running adjustment information in the storage 24, as a set (step S16).

As a result, when the running adjustment information is stored, the ATO device 23 calculates a running plan between the stations so that the speed while a part of the train 11 is passing through the running position (or the position around the center of the curved section) corresponding to the running adjustment information, becomes the stored passing speed (step S17).

In this case, when it is determined that, on the basis of the actual vehicle occupancy corresponding to the actual load compensation information, the vehicle occupancy is higher than the vehicle occupancy corresponding to the load compensation information of the running adjustment information, the ATO device 23 sets the passing speed faster than the passing speed stored as the running adjustment information so that the centrifugal force is applied more. On the other hand, when it is determined that, on the basis of the actual vehicle occupancy corresponding to the actual load compensation information, the vehicle occupancy is lower than the vehicle occupancy corresponding to the load compensation information of the running adjustment information, the ATO device 23 calculates the running plan by setting the passing speed slower than the passing speed stored as the running adjustment information so as to reduce the centrifugal force. The ATO device 3 then finishes the process.

On the other hand, in the determination at step S13, when the acceleration in the counter direction CDR (rotation center direction) of the turning direction is not detected (No at step S13), the ATO device 23 finishes the setting process of the passing speed.

As a result, even if the running route has a curve with a cant, it is possible to set the passing speed so that the cant is placed in a balanced cant. Hence, it is possible to improve the riding comfort.

In the above description, the passing speed is set corresponding to the load compensation information. However, for example, the ATO device 23 may also calculate the running plan, by storing the passing speed when the load compensation information is 0%, 50%, 100%, . . . , and 250%, respectively, and sets the passing speed to be a passing speed determined by the interpolation method. Moreover, the ATO device 23 adjusts the speed of the running adjustment information by comparing the running result with the running adjustment information.

In the above description, the ATO device 23 associates the acceleration direction, the amplitude, the turning direction of the train, the passing speed, the position where the vibration has occurred, and the date and time of occurrence with one another as the vibration detection information, and stores the associated pieces of information as a set up to a certain number (for example, the latest 100 sets), when the acceleration of the vehicle in the vertical direction or the horizontal direction that is input from the acceleration detection unit 26 is vibrated at an amplitude of equal to or more than a certain value.

However, it is also possible to provide a communication device such as a wireless communication device to the ATO device, the communication device notifies a ground side control device provided on the ground side of the vibration detection information described above, and the ground side control device stores the vibration detection information and uses the information to control the traffic of the other trains. With this configuration, the information acquired by a single train 11 can be shared with a plurality of trains. Consequently, it is possible to contribute in improving the riding comfort furthermore.

In this manner, even if the running route has a curve with a cant, the train 11 can run the running route at the passing speed equivalent to when the cant is placed in the balanced cant. Consequently, it is possible to improve the riding comfort.

2. Train Running Control when Train will Stop at Track Different from That in Running Plan Determined in Advance Next, train running control when a train will stop at a track different from that in the running plan determined in advance, will be described.

First, conventional problems will be described.

To stop the train accurately at a certain position in the station (for example, within a stop position error of ±35 cm), the ATO device 23 needs to correctly grasp the position of the train in which the ATO device 23 is installed.

Thus, in general, the train position information recognized by the ATO device 23 will be corrected, by correcting the position of the train using the ground coils 31 at a plurality of locations before the station (for example, three locations with the remaining distance of 400 m, 20 m, and 1 m).

In general, there is a difference of a few tens of centimeters in the running distance from a branch section to a certain stop position, between the main line (first track) and the sub-main line (second track). Thus, when the position of the train is corrected at a ground coil before the branch section (for example, at a remaining distance of 400 m), and then corrected again at the next ground coil (for example, at a remaining distance of 20 m) after the train has passed the branch section and entered the sub-main line, the train position information to be recognized by the ATO device 23 may be corrected to a large extent relative to the remaining distance.

For example, it is assumed that a position detection error that occurs while the train is traveling from the ground coil placed at a remaining distance of 400 m to the next ground coil placed at a remaining distance of 20 m falls within a range of 380 m×+0.2%=+0.76 m at most. However, when an error of 60 cm, a difference between the actual running distances, is added to the above-described error, the position of the train to be corrected by the ground coil placed at a remaining distance of 20 m may be 1 m or more. This corresponds to 5% more of the remaining distance.

Thus, the position of the train will be corrected to a relatively large extent just before the train stops, and there is a possibility of deteriorating the riding comfort, due to the confusion in the control command.

Moreover, depending on the station, a certain stop position is deviated by 1 to 2 m, between the main line (first track) and the sub-main line (second track). In such a case, for example, when the train scheduled to enter the main line (first track) has entered the sub-main line (second track), the position of the train may be corrected as much as 2 m or more, by the ground coil (for example, remaining distance of 20 m) that is provided after the train has entered the sub-main line (second track).

In this manner, when the position of the train is corrected to a large extent just before the train stops, not only the riding comfort but also the accuracy of the stop position will likely be deteriorated. Thus, an additional ground coil may be placed on the sub-main line side after the branching, and the position of the train may be corrected before the brake is applied to stop the train at the station. However, when there are many tracks or when a plurality of train sets with different train set lengths need to be dealt with, a number of additional ground coils need to be installed. This may lead to an increase in the installation cost and maintenance cost.

Figure 4:
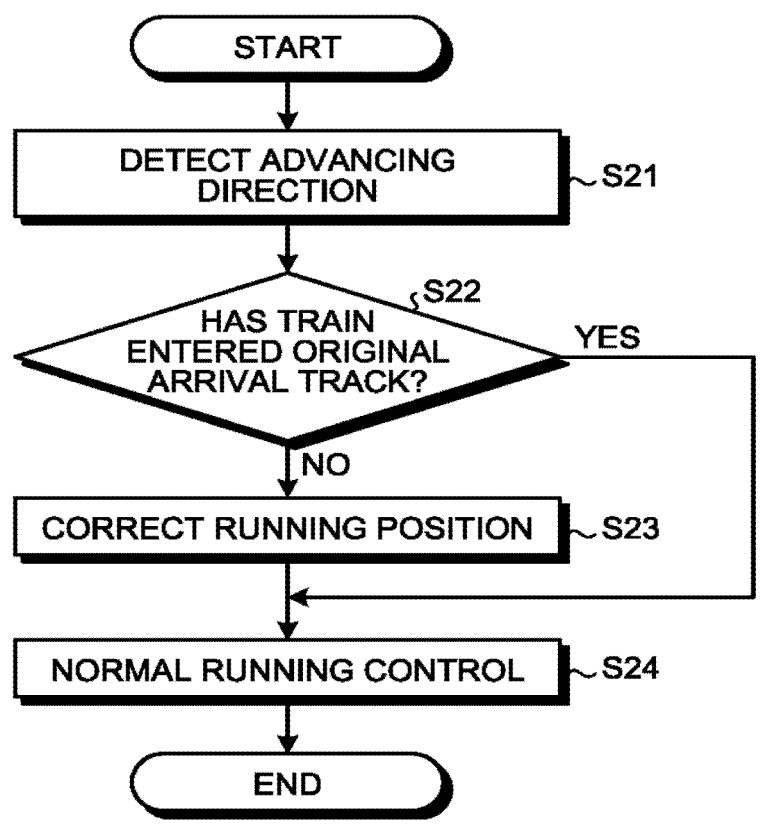
FIG. 4 is a processing flow chart of the train running control when a train will stop at a track different from that in the running plan determined in advance according to the embodiment.

FIG. 4 is a processing flow chart of the train running control when a train will stop at a track different from that in the running plan determined in advance.

In the present example, the ATO device 23 detects the advancing direction (turning direction) of the train 11 at each branching position on the rail RL, by integrating the angle acceleration in the yaw direction that is obtained by the acceleration detection unit 26 in the lead vehicle of the train 11, while the train 11 is running (step S21).

The ATO device 23 then matches the detected advancing direction with the linear information read out from the storage 24, and determines which track the train 11 has entered on the basis of the advancing direction (turning direction) and the number of times (step S22).

In the present embodiment, when the train 11 has entered the track other than the reference track, as will be described in the following, the ATO device 23 performs the train running control by correcting the train position information on basis of a difference between the running distances to the stop target positions.

Figure 5:
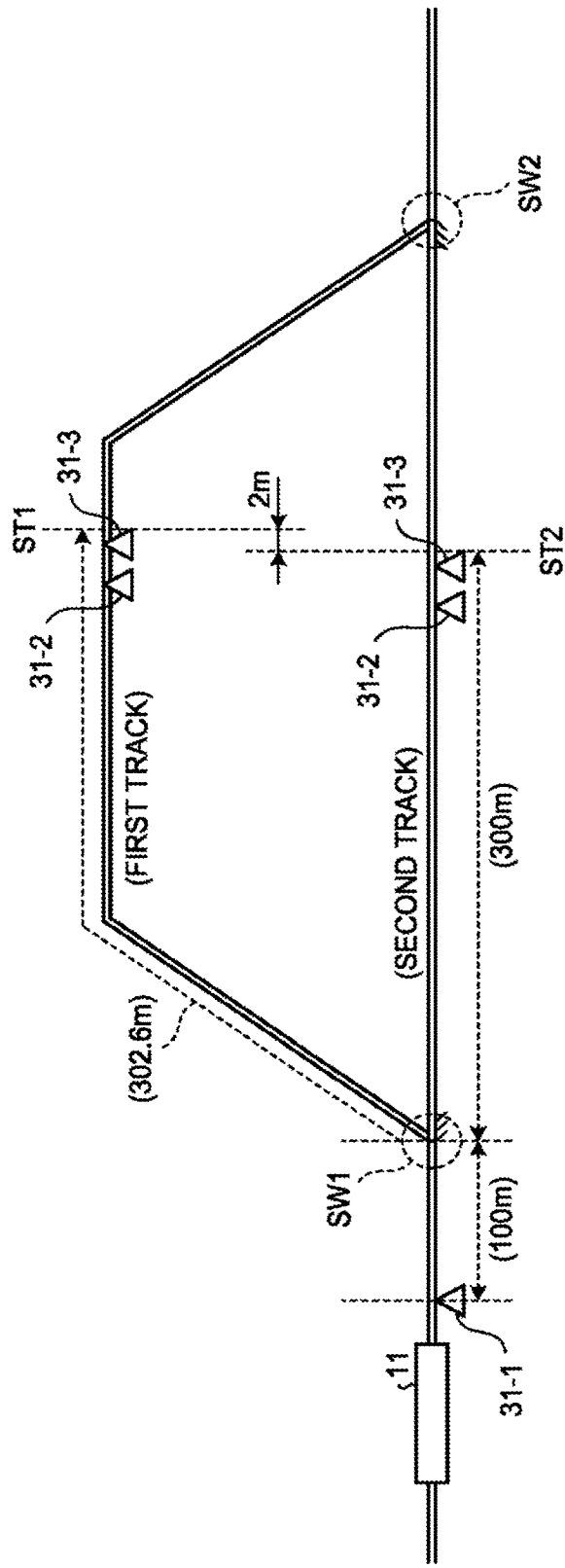
FIG. 5 is an explanatory diagram when a train will stop at a track different from that in the running plan determined in advance according to the embodiment.

FIG. 5 is an explanatory diagram when a train will stop at a track different from that in the running plan determined in advance.

More specifically, as illustrated in FIG. 5, a station has a first track and a second track for the outbound train.

In this case, there is 60 cm difference between the first track and the second track in the running distance from the branching position where the train can proceed to the tracks to the certain stop positions. It is assumed that there is 2 m difference between the actual stop positions of the first track and the second track.

In other words, as illustrated in FIG. 5, it is assumed that the running distance from a first branching position SW1 to a stop target position ST1 in the first track is 302.6 m, and the running distance from the first branching position SW1 to a stop target position ST2 in the second track is 300 m.

It is also assumed that the train is expected to arrive at the second track when the train has passed the first branching position SW1 in a normal direction, and a first ground coil 31-1 for correcting the position is placed at the location where the running distance to the stop target position ST2 in the second track is 400 m.

In the determination at step S22, when the train 11 has passed the first branching position SW1 in the normal direction (Yes at step S22), the turn (change in the advancing direction) of the train 11 is not detected at the first branching position SW1, from the integration of the angle acceleration in the yaw direction that is obtained from the acceleration detection unit 26. Thus, the ATO device 23 determines that the train 11 has entered the second track, and proceeds to a normal running control, without correcting the train position information (step S24).

On the other hand, in the determination at step S22, when the train 11 has passed the first branching position SW1 in a direction different from the normal direction (No at step S22), the ATO device 23 detects the turn of the train in the left direction at the first branching position SW1, from the integration of the angle acceleration in the yaw direction that is obtained from the acceleration detection unit 26.

Hence, the ATO device 23 determines that the train 11 will enter the first track, and corrects the running position (=train position information) by increasing the remaining distance as much as 2.6 m that is a difference between the running distance 300 m of the train 11 to the stop target position ST2 in the second track and the running distance 302.6 m of the train 11 to the stop target position ST1 in the first track (in a direction of drawing back the train on the rail track as much as 2.6 m)(step S23).

Thus, the error of the running position (=train position information) resulting from the difference between the running distances according to the tracks is corrected, when the train passes the branch section (=first branching position SW1).

Consequently, in the subsequent normal running control (step S24), when a train passes a second ground coil 31-2 for correcting the position that is placed at a location where the running distance to the stop target position is 20 m, the position of the train will not be corrected to a large extent, even if the train has entered the first track. Hence, there will be no unsteadiness in the braking command output from the ATO device 23, and it is possible to prevent deterioration in riding comfort.

As described above, it is possible to reduce vibration by slowing down the running speed at the location where vibration is apt to occur, such as at the branch section.

When the vibration is detected at the location other than the branch section, there may be a problem in track maintenance. Thus, a communication device, which is not illustrated, may be used to transmit vibration generation information to the traffic control center on the ground.

Moreover, the vibration detection information and the running adjustment information may be transmitted to the traffic control center, and the traffic control center may collect the above-described information. An appropriate running speed may be determined by referring to the collected data, while the train is stopping at a station and the like.

The computer program to be executed by the train control device of the present invention may be provided by being recorded in a computer readable recording medium such as a compact disc-read only memory (CD-ROM), a flexible disk FD), a compact disc-recordable (CD-R), a digital versatile disc (DVD), in an installable or executable file format.

The computer program to be executed by the train control device of the present embodiment may be stored in a computer connected to a network such as the Internet, and provided by being downloaded through the network. Moreover, the computer program to be executed by the train control device of the present embodiment may be provided or distributed via a network such as the Internet.

Furthermore, the computer program of the train control device of the present embodiment may be incorporated in advance in a read-only memory (ROM) or the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A train control method that is executed by a train control device mounted on a train, the train control method comprising:
   detecting acceleration of the train along a rotation radius direction, when the train is turning and passing a curved section of a rail line with a cant; and
   setting a passing speed of the train passing through the curved section so that the state of the train is placed in a balanced cant, based on a direction of the detected acceleration.

2. The method according to claim 1, further comprising:
detecting load compensation of the train; and
correcting the passing speed based on vehicle occupancy corresponding to the load compensation.

3. The method according to claim 1, further comprising:
correcting the passing speed to a faster speed, when the vehicle occupancy is determined to be higher than the vehicle occupancy corresponding to load compensation information that is used to set the passing speed of the train so that the state of the train is placed in the balanced cant; and
correcting the passing speed to a slower speed, when the vehicle occupancy is determined to be lower than the vehicle occupancy corresponding to load compensation information that is used to set the passing speed of the train so that the state of the train is placed in the balanced cant.

4. The method according to claim 1, further comprising:
detecting acceleration of the train in a vertical direction, a horizontal direction, and a front-to-rear direction;
associating a direction of acceleration, amplitude, a passing speed, a location where vibration has occurred, and date and time of occurrence with one another as vibration detection information; and
storing the vibration detection information, when the acceleration of the train in the vertical direction or the horizontal direction becomes equal to or more than a certain value.

5. The method according to claim 1, further comprising:
detecting acceleration of the train in a vertical direction, a horizontal direction, and a front-to-rear direction;
associating a direction of acceleration, amplitude, a passing speed, a location where vibration has occurred, and date and time of occurrence with one another, as vibration detection information; and
communicating with and notifying a ground side of the vibration detection information through communication, when the acceleration of the train in the vertical direction or the horizontal direction becomes equal to or more than a certain value.

6. A computer program product including programmed instructions embodied in and stored on a non-transitory computer readable medium, wherein the instructions, when executed by a computer, cause the computer to perform:
detecting acceleration of the train along a rotation radius direction, when the train is turning and passing a curved section of a rail line with a cant; and
setting a passing speed of the train passing through the curved section so that the state of the train is placed in a balanced cant, based on a direction of the detected acceleration.

* * * * *